United States Patent
Fan et al.

(10) Patent No.: US 7,818,797 B1
(45) Date of Patent: Oct. 19, 2010

(54) METHODS FOR COST-SENSITIVE MODELING FOR INTRUSION DETECTION AND RESPONSE

(75) Inventors: Wei Fan, New York, NY (US); Wenke Lee, Atlanta, GA (US); Matthew Miller, New York, NY (US); Salvatore J. Stolfo, Ridgewood, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 968 days.

(21) Appl. No.: 10/269,718

(22) Filed: Oct. 11, 2002

Related U.S. Application Data

(60) Provisional application No. 60/340,198, filed on Dec. 14, 2001, provisional application No. 60/328,682, filed on Oct. 11, 2001.

(51) Int. Cl.
*G06F 12/16* (2006.01)
(52) U.S. Cl. .............................. 726/22; 726/23; 726/25
(58) Field of Classification Search ................ 709/246, 709/209; 713/182, 189
See application file for complete search history.

(56) References Cited

U.S. PATENT DOCUMENTS

| | | | |
|---|---|---|---|
| 6,161,130 A | 12/2000 | Horovitz et al. | |
| 6,778,995 B1 | 8/2004 | Gallivan | |
| 6,820,081 B1 | 11/2004 | Kawai et al. | |
| 6,826,694 B1* | 11/2004 | Dutta et al. | 726/13 |
| 6,856,694 B2* | 2/2005 | Farmer et al. | 382/107 |
| 6,888,548 B1 | 5/2005 | Gallivan | |
| 6,928,549 B2* | 8/2005 | Brock et al. | 713/194 |
| 6,978,274 B1 | 12/2005 | Gallivan et al. | |
| 7,032,031 B2* | 4/2006 | Jungck et al. | 709/246 |
| 7,035,876 B2 | 4/2006 | Kawai et al. | |
| 7,080,076 B1 | 7/2006 | Williamson et al. | |
| 2003/0188189 A1* | 10/2003 | Desai et al. | 713/201 |
| 2004/0172557 A1* | 9/2004 | Nakae et al. | 713/201 |
| 2005/0015624 A1* | 1/2005 | Ginter et al. | 713/201 |
| 2005/0182969 A1* | 8/2005 | Ginter et al. | 713/201 |
| 2006/0080656 A1* | 4/2006 | Cain et al. | 717/174 |
| 2007/0006303 A1* | 1/2007 | Donnelly et al. | 726/22 |
| 2008/0010251 A1* | 1/2008 | Fontoura et al. | 707/3 |

OTHER PUBLICATIONS

U.S. Appl. No. 10/208,402, filed Jul. 30, 2002, Stolfo et al.

(Continued)

*Primary Examiner*—Pramila Parthasarathy
(74) *Attorney, Agent, or Firm*—Byrne Poh LLP

(57) ABSTRACT

A method of detecting an intrusion in the operation of a computer system based on a plurality of events. A rule set is determined for a training set of data comprising a set of features having associated costs. For each of a plurality of events, the set of features is computed and a class is predicted for the features with a rule of the rule set. For each event predicted as an intrusion, a response cost and a damage cost are determined, wherein the damage cost is determined based on such factors as the technique of the intrusion, the criticality of the component of the computer system subject to the intrusion, and a measure of progress of the intrusion. If the damage cost is greater than or equal to the response cost, a response to the event.

35 Claims, 3 Drawing Sheets

OTHER PUBLICATIONS

U.S. Appl. No. 10/208,432, filed Jul. 30, 2002, Stolfo et al.
U.S. Appl. No. 10/222,632, filed Aug. 16, 2002, Stolfo et al.
U.S. Appl. No. 10/269,694, filed Oct. 11, 2002, Stolfo et al.
U.S. Appl. No. 10/320,259, filed Dec. 16, 2002, Stolfo et al.
U.S. Appl. No. 10/327,811, filed Dec. 19, 2002, Stolfo et al.
U.S. Appl. No. 10/352,342, filed Jan. 27, 2003, Stolfo et al.
U.S. Appl. No. 10/352,343, filed Jan. 27, 2003, Stolfo et al.
A. Ghosh and A. Schwartzbard, "A Study in Using Neural Networks for Anomaly and Misuse Detection," *Proceedings of the 8th USENIX Security Symposium*, 1999).
A. McCallum, Kamal Nigam, and Lyle H. Ungar, "Efficient Clustering of High-Dimensional Data Sets with Application to Reference Matching," *Knowledge Discovery and Data Mining*, pp. 169-178, 2000.
B. Schölkopf, J. Platt, J. Shawe-Taylor, A. J. Smola, and R. C. Williamson, "Estimating the Support of a High-Dimensional Distribution," Technical Report 99-87, Microsoft Research, 1999, to appear in *Neural Computation*, 2001.
Bhattacharyya M et al., 2002, "MET: An Experimental System for Malicious Email Tracking" *Proceedings 2002 New Security Paradigms Workshop*.
C. Marceau. "Characterizing the Behavior of a Program Using Multiple-Length N-Grams." *Proceedings of the New Security Paradigms Workshop 2000*, 2000, pp. 101-110.
C. Warrender, Stephanie Forrest, and Barak Pearlmutter, "Detecting Intrusions Using System Calls: Alternative Data Models," *1999 IEEE Symposium on Security and Privacy*, pp. 133-145. IEEE Computer Society, 1999.
C. Watkins, "Dynamic Alignment Kernels," in A.J. Smola, P.L. Bartlett, B. Schölkopf, and D. Schuurmans, editors, *Advances in Large Margin Classifiers*, pp. 39-50, Cambridge, MA, 2000. MIT Press.
Clark DD, 1988, "The Design Philosophy of the DARPA Internet Protocols" *Communication Architecture and Protocols*, pp. 106-114.
D. Ron, Y Singer, and N. Tishby. "The Power of Amnesia: Learning Probabilistic Automata With Variable Memory Length." *Machine Learning*, 1996, 25: pp. 117-150.
D. Schuurmans, editors, *Advances in Large Margin Classifiers*, pp. 39-50, Cambridge, MA, 2000. MIT Press.
D. Haussler, "Convolution Kernels on Discrete Structures," Technical Report UCS-CRL-99-10, UC Santa Cruz, 1999.
D.E. Denning, An Intrusion Detection Model, *Technical Report, Computer Science Laboratory, SRI International*, 1993).
E. Eskin, "Anomaly Detection Over Noisy Data Using Learned Probability Distributions," *Proceedings of the International Conference on Machine Learning*, 2000.
E. Eskin, Christina Leslie and William Stafford Noble, "The Spectrum Kernel: A String Kernel for SVM Protein Classification," *Proceedings of the Pacific Symposium on Biocomputing (PSB-2002)*. Kaua'i, Hawaii, 2002.
E. Eskin, Wenke Lee, and Salvatore J. Stolfo, "Modeling System Calls for Intrusion Detection With Dynamic Window Sizes," *Proceedings of DARPA Information Survivability Conference and Exposition II (DISCEX II)*, Anaheim, CA, 2001.
E. Knorr and Raymond T. Ng, "Algorithms for Mining Distance-Based Outliers in Large Datasets," *Proc. 24th Int. Conf. Very Large Data Bases, VLDB*, pp. 392-403, 24-27, 1998.
E. Knorr and Raymond T. Ng, "Finding Intensional Knowledge of Distance-Based Outliers," *The VLDB Journal*, pp. 211-222, 1999.
Eleazar Eskin et al. "System and Method for Intrusion Detection with Dynamic Window Sizes," filed Jul. 30, 2000, U.S. Appl. No. 10/208,402.
Eleazar Eskin, William Noble Grundy, Yoram Singer, "Protein Family Classification using Sparse Markov Transducers," *Proceedings of the Eighth International Conference on Intelligent Systems for Molecular Biology*, AAAI Press, Menlo Park, CA, 2000.
F. Pereira and Y Singer. "An Efficient Extension to Mixture Techniques for Prediction and Decision Trees."—*Machine Learning*, 1999, 36(3): pp. 183-199.

F. Provost, T. Fawcett, and R Kohavi. "The Case Against Accuracy Estimation for Comparing Induction Algorithms." *Proceedings of the Fifteenth International Conference on Machine Learning*, Jul. 1998, pp. 1-9.
F. Provost, Tom Fawcett, and Ron Kohavi, The Case Against Accuracy Estimation for Comparing Induction Algorithms, *Proceedings of the Fifteenth International Conference on Machine Learning*, Jul. 1998.
Feng C et al., 1994, "Machine Learning of Rules and Trees" *Machine Learning, Neutral and Statistical Classification*, pp. 50-83.
Ferguson P et al., 1998, "Network Ingress Filtering: Defeating Denial of Service Attacks which employ IP Source Address Spoofing" *Internet Society* pp. 1-10.
Friedman N et al., (1999) "Efficient bayesian parameter estimation in large discrete domains."
Gibson S, 2001, "The Strange Tale of Denial of Service—Attacks Against GRC.COM" http://grc.com/dos/grcdos.htm, pp. 1-29.
H.S. Javitz and A. Valdes, "The NIDES Statistical Component: Description and Justification," *Technical Report, Computer Science Laboratory, SRI International*, 1993.
Honig A et al., (2002) "Adaptive model generation: An Architecture for the deployment of data mining-based intrusion detection systems." In *Data Mining for Security Applications*. Kluwer.
Houle KJ, Oct. 2001, "Trends in Denial of Service Attack Technology" *CERT® Coordination Center*. 1.0:1-20.
J. Platt, "Fast Training of Support Vector Machines Using Sequential Minimal Optimization," In B. Scholkopf, C. J. C. Burges, and A. J. Smola, editors, *Advances in Kernel Methods—Support Vector Learning*, pp. 185-208, Cambridge, MA, 1999, MIT Press.
Kephart JO, 1994, "A biologically inspired immune system for computers" *Artificial Life IV, R. Brooks and P. Maes, eds.*, pp. 1-10.
Kephart, Chess, and White. "Computers and Epidemiology," IBM Watson Research Center, 1993, pp. 1-20 (as available on-line).
Kin C. Bron and J. Kerbosch. "Algorithm 457: Finding All Cliques of an Undirected Graph," Communications of ACM, 16:575-577, 1973.
Kohavi R, 1995, "A study of cross-validation and bootstrap for accuracy estimation and model selection" *International Joint Conference on Artificial Intelligence (IJCAI)*.
Kymie M. C. Tan, Roy A. Maxion: " 'Why 6?' Defining the Operational Limits of stide, an Anomaly-Based Intrusion Detector." IEEE Symposium on Security and Privacy 2002, May 12-15, 2002, pp. 188-201.
Lippmann RP et al., 1999, "Results of the DARPA 1998 Offline Intrusion Detection Evaluation" *MIT Lincoln Laboratory*, pp. 1-29.
M. Breunig, H-P Kriegel, R. Ng, and J. Sander, "LOF: Identifying Density-Based Local Outliers," *ACM SICMOD Int. Conf. on Management of Data*, pp. 93-104, 2000.
Matthew Schulz et al. "System and Method for Detection of New Malicious Executables," filed Jul. 30, 2000, U.S. Appl. No. 10/208,432.
Mohiuddin S et al., Jun. 2002, "Defending Against a large scale Denial-of-Service Attack" *Proceedings of the 2002 IEEE Workshop on Information Assurance and Security*, pp. 30-37.
Moore D et al., 2001, "Inferring Internet Denial-of-Service Activity" *Usenix*, pp. 1-14.
Moskowitz IS et al., Mar. 2001, "Randomly Roving Agents for Intrusion Detection" *Information Technology Division, Naval Research Laboratory, CHACS*, pp. 1-16.
N. Ye. "A Markov Chain Model of Temporal Behavior for Anomaly Detection," *Proceedings of the 2000 IEEE Systems, Man, and Cybernetics Information Assurance and Security Workshop*, Jun. 6-7, 2000, pp. 171-174.
N. Cristianini and J. Shawe-Taylor, *An Introduction to Support Vector Machines*, Cambridge University Press, Cambridge, UK, 2000, pp. 9-51.
Perkins C, 1996 "Rfc 2002: IP Mobility Support" http://www.faqs.org/rfcs/rfc2002.html, pp. 1-74.
R. P. Lippmann, R. K. Cunningham, D. J. Fried, I. Graf, K. R. Kendall, S. W. Webster, and M. Zissman, Results of the 1999 DARPA Off-Line Intrusion Detection Evaluation, *Second International Workshop on Recent Advances in Intrusion Detection (RAID 1999)*, West Lafayette, IN, 1999.

Razmov V, May 2000, "Denial of Service Attacks and How to Defend Against Them" *Computer Science and Engineering Department*, University of Washington, pp. 1-7.

Rivest RL, 1992, "The MD5 message digest algorithm" *MIT Laboratory for Computer Science and RSA Data Security, Inc.*, http://www.ietf.organization/rfc/rfc1321.txt, pp. 1-20.

Roesch M, 1999, "Snort—Lightweight Intrusion Detection for Networks" *LISA XIII Systems Conferences*, Seattle, WA, pp. 229-238.

S. Forrest, S. A. Hofmeyr, A. Somayaji, and T. A. Longstaff, "A Sense of Self for UNIX Processes," *1996 IEEE Symposium on Security and Privacy*, pp. 120-128. IEEE Computer Society, 1996.

Schultz MG et al., Jun. 2001, "Mef: Malicious email filter—a unix mail filter that detects malicious windows executables" http://www.cs.columbia.edu/ids/mef/rel_papers.html, *USENIX Annual Technical Conference*.

Schultz MG et al., May 2001, "Data mining methods for detection of new malicious executables" *Proceedings of the IEEE Symposium on Security and Privacy*.

Spatscheck O et al., 1999, "Defending Against Denial of Service Attacks in Scout" *Proceedings of 3rd USENIX/ACM*, pp. 59-72.

Taylor C et al., Sep. 2001, "Nate—Network Analysis of Anomalous Traffic Events, a low-cost approach" *New Security Paradigms Workshop*, pp. 89-96.

V. Paxson. "Bro: A System for Detecting Network Intruders in Real-Time," *Proceedings of the 7th USENIX Security Symposium*, San Antonio, TX, 1998.

W Lee and D. Xiang. "Information-Theoretic Measures for Anomaly Detection." *Proceedings of the 2001 IEEE Symposium on Security and Privacy*, May 2001, pp. 1-17.

W. Fan and S. Stolfo, "Ensemble-Based Adaptive Intrusion Detection," *Proceedings of 2002 SIAM International Conference on Data Mining*, Arlington, VA, 2002.

W. Lee and S. J. Stolfo, "Data Mining Approaches for Intrusion Detection," *Proceedings of the 1998 USENIX Security Symposium*, 1998.

W. Lee, S. J. Stolfo, and K. Mok, "Mining in a Data-flow Environment: Experience in Intrusion Detection," *Proceedings of the 1999 Conference on Knowledge Discovery and Data Mining (KDD-99)*, 1999.

W. Lee, S. J. Stolfo, and P. K. Chan, "Learning Patterns From UNIX Processes Execution Traces for Intrusion Detection," *AAAI Workshop on AI Approaches to Fraud Detection and Risk Management*, pp. 50-56. AAAI Press, 1997.

W.O. International, 1993-2003, "PC Viruses in the Wild" http://www.bocklabs.wisc.edu/janda/wildlist.html, pp. 1-15.

Wang C et al., 2000, "On computer viral infection and the effect of immunization" *Proceedings of the 16th ACM Annual Computer Applications Conference*.

White SR et al., 1999, "Anatomy of a Commercial-Grade Immune System" *IBM Research White paper*, http://www.av.ibm.com/ScientificPapers/White/Anatomy/anatomy.html, pp. 1-28.

White SR, Oct. 1998, "Open problems in computer virus research" *Online publication*, http://www.research.ibm.com/antivirus/SciPapers/White/Problems, *Virus Bulletin Conference*, pp. 1-11.

Y Singer. "Adaptive Mixtures of Probabilistic Transducers." *Neural Computation*, 1997, 9(8):pp. 1711-1734.

R.P. Campbell et al., "A Modular Approach to Computer Security Risk Management," *AFIPS Conference Proceedings*, AFIPS Press, 1979.

U. Lindqvist et al., "How to Systematically Classify Computer Security Intrusions," *Proceedings of the 1997 IEEE Symposium on Research in Security and Privacy*, Oakland, CA, May 1997, pp. 154-163.

S. Glaseman et al., "Problem Areas in Computer Security Assessment," *Proceedings of the National Computer Conference*, 1977.

S. Northcutt, *Intrusion Detection: An Analyst's Handbook*, New Riders, 1999, pp. 39-40.

D. Denning, *Information Warfare and Security*, Addison Wesley, 1999, pp. 23-25, and 385-388.

R. Bace, *Intrusion Detection*, Macmillan Technical Publishing, 2000, pp. 156, 237-238.

E. Amoroso, *Intrusion Detection: An Introduction to Internet Surveillance, Correlation, Traps, Trace Back, and Response, Intrusion*. Net Books, 1999. pp. 145-167.

W.W. Cohen. "Fast Effective Rule Induction," *Machine Learning: the 12th International Conference*, Lake Taho, CA, 1995.

Quinlan, J.R. *C4.5: Programs for Machine Learning*. San Mateo: Morgan Kaufmann, 1993.

T. Mitchell. *Machine Learning*. McGraw-Hill, 1997 pp. 171-174.

P. Domingos, "Metacost: A General Method for Making Classifiers Cost-Sensitive," *Proceedings of the 5th ACM SIGKDD International Conference on Knowledge Discovery & Data Mining (KDD-99)*, Aug. 1999.

T. Ptacek et al., "Insertion, Evasion and Denial of Service: Eluding Network Intrusion Detection," Secure Networks, Inc., Jan. 1998.

* cited by examiner

US 7,818,797 B1

METHODS FOR COST-SENSITIVE MODELING FOR INTRUSION DETECTION AND RESPONSE

CROSS-REFERENCE TO RELATED APPLICATIONS

This application claims the benefit of U.S. Provisional Patent Application Ser. Nos. 60/340,198, filed on Dec. 14, 2001, entitled "Method of Detecting and Responding to Computer System Intrusions Using Cost-Based Models" and 60/328,682, filed on Oct. 11, 2001, entitled "Method and Apparatus for Combining Multiple Models for Intrusion Detection System," which are hereby incorporated by reference in their entirety herein.

STATEMENT OF GOVERNMENT RIGHT

This invention was made with government support under grant nos. F 30602-00-1-0603 and NCSU 00-0341-02 awarded by the United States Defense Advanced Research Projects Agency (DARPA). The government has certain rights to in this invention.

COMPUTER PROGRAM LISTING

A computer program listing is submitted in duplicate on CD. Each CD contains several routines which are listed in the Appendix. The CD was created on Oct. 11, 2002. The files on this CD are incorporated by reference in their entirety herein.

BACKGROUND OF THE INVENTION

1. Field of the Invention

This invention relates to methods of intrusion detection in a computer system, and more particularly, to cost-sensitive machine learning techniques that can construct detection models optimized for cost considerations.

2. Background Information

Given the increasing reliance by businesses, governmental bodies, educational institutions, and individuals upon network-based computer systems, it has become critical to protect these systems from "intrusions" or "attacks" (such terms used interchangeably herein), which are typically unauthorized and/or malicious activity. These intrusions may have the effect of compromising security, corrupting data or erroneous output, or causing complete or partial shutdowns of such computer systems. Consequently, intrusion detection, the process of identifying and responding to malicious activity targeted at computing and networking resources, has become a critical component of computer system infrastructure protection mechanisms.

A primary focus of existing intrusion detection development to date is an attempt to maximize the detection accuracy and bandwidth capabilities of an Intrusion Detection System ("IDS"). Consequently, many existing IDS developers have used "brute force" techniques to attempt to correctly detect a larger spectrum of intrusions than their competitors, e.g., a higher percentage of "true positive" detections, while having lower percentages of "false negative" (e.g., intrusions misclassified as normal activity) and "false positives" or false alarms (e.g., normal activity misclassified as an intrusion). However, the goal of catching all intrusions has proven to be a major technical challenge. After more than two decades of research and development efforts, many known IDS's have marginal detection rates and high false alarm rates, especially when detecting stealthy or novel intrusions.

Exemplary, novel techniques for intrusion detection are described in co-pending U.S. application Ser. No. 10/208,402 filed Jul. 30, 2002, entitled "System and Methods For Intrusion Detection With Dynamic Window Sizes," U.S. application Ser. No. 10/208,432 filed Jul. 30, 2002, entitled "System and Methods For Detection of New Malicious Executables," and U.S. application Ser. No. 10/222,632 filed Aug. 16, 2002, entitled "System and Methods For Detecting Malicious Email Transmission," each of which is incorporated by reference in its entirety herein.

The above-stated goal of attempting to catch all intrusions encounters several impracticalities in IDS deployment, such as constraints on time (e.g., processing speed) and availability of resources (both human and computer). These constraints may become overwhelmingly restrictive to the operation of an IDS. An IDS usually perform passive monitoring of a network or system activities, e.g., observing the traffic on a network or system without any attempt to control access to or from that network or system, rather than active filtering, e.g., "in-line monitoring," which typically occurs on a host that spans multiple networks and can filter traffic to and/or from any of those networks (as is the case with Firewalls). It is desirable for an IDS to keep up with the throughput of the data stream that it monitors, i.e., handle the high bandwidths of the data stream being monitored in real time, so that intrusions can be detected in a timely manner. A real-time IDS can thus become vulnerable to overload intrusions, such as those described in T. Ptacek and T. Newsham, "Insertion, Evasion and Denial of Service: Eluding Network Intrusion Detection," Secure Networks, Inc., January 1998, online publication http:/www.merit.edu/merit/resources/idspaper.html, which is incorporated by reference in its entirety herein. In an overload intrusion, the intruder first directs a huge amount of malicious traffic at the IDS (or some machine being monitored by the IDS) and devotes resources to this malicious traffic to the point that it can no longer track all data necessary to detect every intrusion. With the diversion of the IDS resources, the intruder can then successfully execute a subsequent, intended intrusion, which the IDS will be unable to detect. Similarly, an incident response team may be overloaded by intrusion reports and may decide to raise detection and response thresholds, as described in R. P. Campbell and G. A. Sands, "A Modular Approach to Computer Security Risk Management," *AFIPS Conference Proceedings*, AFIPS Press, 1979. As a consequence of raising the detection and response thresholds, real intrusions may be ignored.

Some study has been performed to categorize intrusions from different perspectives, although there is no established taxonomy in general use. For example, Lindqvist and Jonsson introduced the concept of the classifying an intrusion by "dimension." (Further details are provided in Ulf Lindqvist et al., "How to Systematically Classify Computer Security Intrusions," *Proceedings of the* 1997 *IEEE Symposium on Research in Security and Privacy*, Oakland, Calif., May 1997, pp. 154-163, which is incorporated by reference in its entirety herein.) The "intrusion results" dimension categorizes intrusions according to their effects (e.g., whether or not denial-of-service is accomplished). The "intrusion techniques" dimension categorizes intrusions based on their methods (e.g., resource or bandwidth consumption). The "intrusion target" dimension categorizes intrusions according to the resource being targeted.

Credit card fraud detection and cellular phone fraud detection also deal with detecting abnormal behavior. Both of these applications are motivated by cost-saving and therefore use cost-sensitive modeling techniques. In credit card fraud detection, for example, the cost factors include operation cost, the personnel cost of investigating a potentially fraudulent transaction (referred to as challenge cost), and loss (referred to as damage cost). If the Dollar amount of a suspected transaction is lower than the challenge cost, the transaction is authorized and the credit card company will take the potential loss. Since the cost factors in fraud detection can be folded into dollar amounts, the cost-sensitive analysis and modeling tasks are much more simple than in intrusion detection.

A disadvantage of current IDS's is that no organized analysis of the costs attributable to intrusion detection and the costs attributable to the intrusion itself is performed to determine how or whether to respond to each intrusion. Currently these cost factors are, for the most part, ignored as unwanted complexities in the development process of an IDS. Some current IDSs try to minimize operational cost, as merely one cost factor among many relevant cost factors. For example, the Bro scripting language for specifying intrusion detection rules does not support for-loops because iteration through a large number of connections is considered time consuming. (See, Paxson, "Bro: A System for Detecting Network Intruders in Real-Time," *Proceedings of the 7th USENIX Security Symposium*, San Antonio, Tex., 1998.)

Glaseman et al. discussed a model for evaluating the total expected cost in using a security system s as $C(s)=O(s)+D(s)$, where $O(s)$ is the operational cost of s and $D(s)$ is the expected loss. (As discussed in S. Glaseman, R. Turn, and R. S. Gaines. "Problem Areas in Computer Security Assessment," *Proceedings of the National Computer Conference*, 1977.) $D(s)$ is calculated by summing the products of exposed value and the probability of safeguard failure over all possible threats.

However, such existing art do not evaluate the cost-effectiveness of the intrusion detection or perform a cost-benefit tradeoff, which may include development cost, the cost of damage caused by an intrusion, the cost of manual or automatic response to an intrusion, and the operational cost, which measures constraints on time and computing resources. Glaseman et al. do not define consequential cost to include the response cost and model its relationship with damage cost, and does not allow cost-based optimization strategies to be explored. For example, Glasemen et al. does not teach that an intrusion which has a higher response cost than damage cost should usually not be acted upon beyond simple logging.

Accordingly, there is a need in the art to provide a technique to evaluating the cost-effectiveness, or to perform a cost-benefit trade-off in the detection and response to individual intrusions, and to construct detection models optimized for overall cost metrics instead of only statistical accuracy.

SUMMARY OF THE INVENTION

An object of the present invention is to provide protection to the information assets of a computer system that are at risk and have value to an organization.

Another object of the present invention is to provide a cost-effective detection technique which considers the expected level of loss from intrusions, and which considers the response cost in detecting and responding to such intrusions.

A further object of the invention is to use data mining algorithms to compute activity patterns and extract predictive features, and then apply machine learning algorithms to generate detection rules.

These and other objects of the invention, which will become apparent with reference to the disclosure herein, are accomplished by a method of detecting an intrusion in the operation of a computer system based on a plurality of events. A rule set is determined for a training set of data comprising a set of features having associated costs. For each of a plurality of events, the set of features is computed and a class is predicted for the features with a rule of the rule set. For each event predicted as an intrusion, a response cost and a damage cost are determined, wherein the damage cost is determined based on such factors as the technique of the intrusion, the criticality of the component of the computer system subject to the intrusion, and a measure of progress of the intrusion. If the damage cost is greater than or equal to the response cost, a response to the event. An attack report may be logged if the damage cost is less than the response cost.

In one embodiment, a sequence of training sets of data is generated, in which each training set comprises a set of features having associated costs. The training sets are ordered such that a first set of features of a first training set is a subset of a next subsequent set of features of a next subsequent training set, and wherein an associated cost of the first set of features is less than an associated cost the next subsequent set of features.

A sequence of rule sets may be determined for each respective training set in the sequence of training sets, in which each rule set comprises a plurality of rules and a class predicted by each the rule, and wherein the rule sets are ordered corresponding to the order of the respective training sets.

For each rule, a next step is to determine a precision measurement indicative of the accuracy of the rule in predicting a class. For each class, a threshold value is determined indicative of a minimum precision for each class.

For each of a plurality of events, beginning with the first rule set, the set of features is computed and a class is predicted for the features with a rule of the rule set. If the precision measurement corresponding to the rule is less than the threshold corresponding to the class, the steps of computing features and predicting the class is repeated with the next rule set in the sequence of rule sets.

In one embodiment, a set of features comprises features computed using information available at the beginning of an event. In another embodiment, a set of features comprises features computed at any time during an event, and maintained throughout the event's duration. In yet another embodiment, a set of features comprises features computed using information from several events within a given time window.

The step of determining a sequence of rule sets may comprise learning the rule set using the RIPPER algorithm. The step of determining a sequence of rule sets may comprise learning an ordered rule set.

The step of determining a precision measurement may comprise determining a ratio of positive counts of the rule to the total counts of the rule. The threshold value is determined as the precision value for the rule in the rule set corresponding to the feature set with the highest cost.

In accordance with the invention, the objects described above have been met, and the need is the art for a technique of modeling a cost-sensitive intrusion detection model has been satisfied.

BRIEF DESCRIPTION OF THE DRAWINGS

Further objects, features and advantages of the invention will become apparent from the following detailed description taken in conjunction with the accompanying figures showing illustrative embodiments of the invention, in which.

Figure 1:
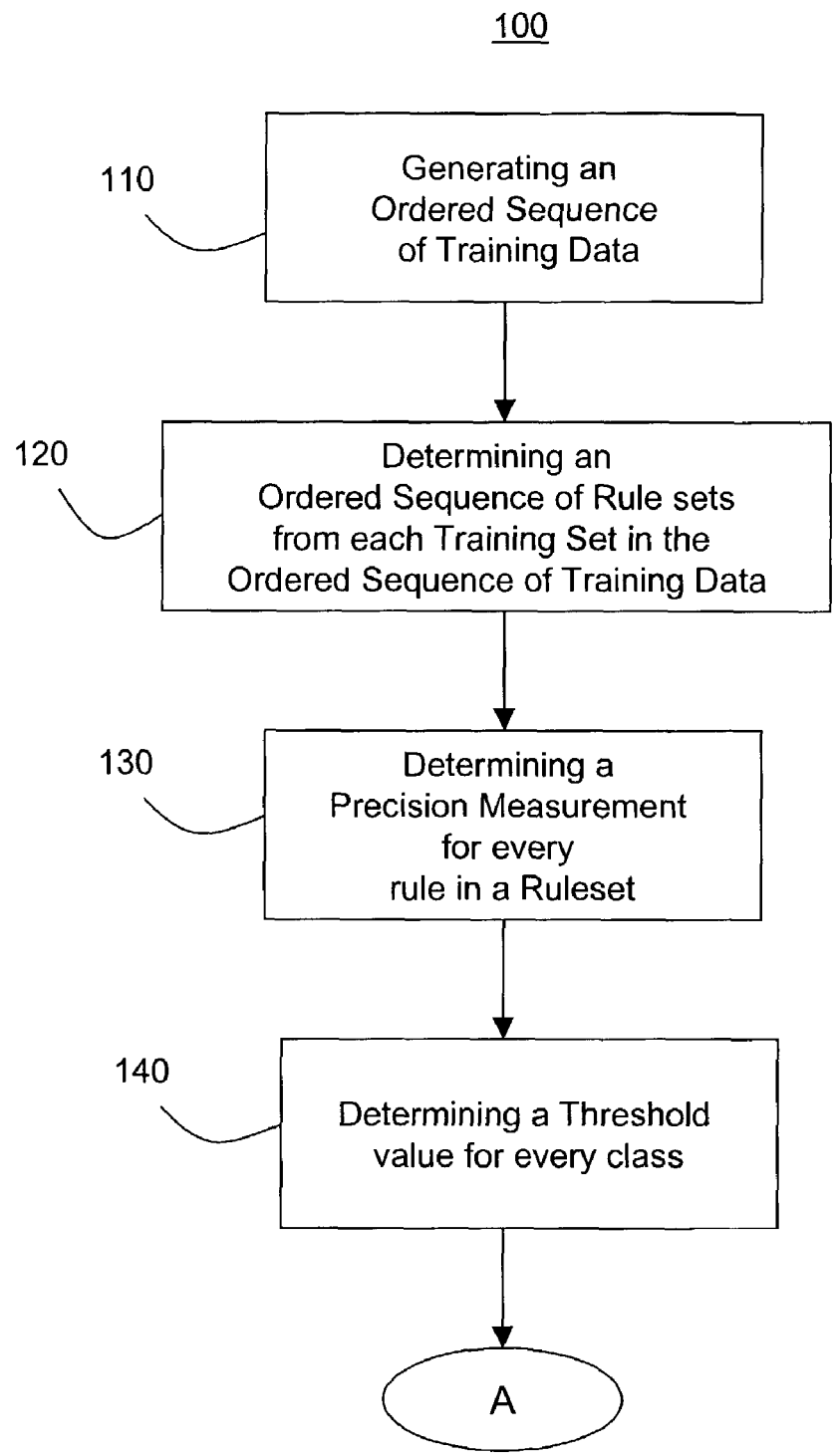
FIG. 1 is a flow chart representing a portion of the process in accordance with the present invention.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF EXEMPLARY EMBODIMENTS

This invention will be further understood in view of the detailed description.

In order to build an intrusion detection system, the relevant cost factors, cost models, and cost metrics related to IDSs, are analyzed. The following are major cost factors related to intrusion detection: damage cost, response cost, and operational cost. Damage cost (DCost) characterizes the amount of damage to a target resource by an intrusion when intrusion detection is unavailable or ineffective. Response cost (RCost) is the cost of acting upon an alarm or log entry that indicates a potential intrusion. Operational cost (OpCost) is the cost of processing the stream of evens being monitored by an IDS and analyzing the activities using intrusion detection models. It is recommended that qualitative analysis be used to measure the relative magnitudes of cost factors. It should also be noted that cost metrics are often site-specific because each organization has its own security policies, information assets, and risk factors.

An intrusion taxonomy is used to produce cost metrics. The taxonomy groups intrusions into different types so that cost measurement can be performed for categories of similar intrusions. Intrusions can be categorized and analyzed from different perspectives. Lindqvist and Jonsson, as discussed above, used the concept of the dimension of an intrusion to classify intrusions. The intrusion results dimension categorizes intrusions according to their effects, and can therefore be used to assess the damage cost and the response cost. The intrusion techniques dimension categorizes intrusions based on their methods, and therefore affects the operational cost and the response cost. The intrusion target dimension categorizes intrusions according to the resource being targeted and affects both the damage costs and the response costs.

TABLE 1

| Main Category (by results) | Description | Sub-Category (by techniques) | Description | Cost |
|---|---|---|---|---|
| 1. ROOT | illegal root access is obtained | 1.1 local | by first logging in as a legitimate user on a local system, e.g., buffer overflow on local system programs such as eject. | DCost = 100 RCost = 40 |
| | | 1.2 remote | from a remote host, e.g., buffer overflow of some daemon running suid root. | DCost = 100 RCost = 60 |
| 2. R2L | illegal user access is obtained from outside. | 2.1 single | a single event, e.g., guessing passwords. | DCost = 50 RCost = 20 |
| | | 2.2 multiple | multiple events, hosts, or days, e.g., the multihop intrusion. | DCost = 50 RCost = 40 |
| 3. DOS | Denial-of-Service of target is accomplished. | 3.1 crashing | using a single malicious event (or a few packets) to crash a system, e.g., the teardrop intrusion. | DCost = 30 RCost = 10 |
| | | 3.2 consumption | using a large number of events to exhaust network bandwidth or system resources, e.g., synflood. | DCost = 30 RCost = 15 |
| 4. PROBE | information about the target is gathered. | 4.1 simple | many of probes within a short period of time, e.g., fast port scan. | DCost = 2 RCost = 5 |
| | | 4.2 stealth | probe events are distributed sparsely across along tune windows, e.g. slow port scan. | DCost = 2 RCost = 7 |

The intrusion taxonomy used in the invention is illustrated in Table 1, and categorizes intrusions that occur in the DARPA Intrusion Detection Evaluation dataset, which was collected in a simulated military environment by MIT Lincoln Lab. (Further details are provide in R. Lippmann et al., "Evaluating Intrusion Detection Systems: The 1998 DARPA Off-Line Intrusion Detection Evaluation," *Proceedings of the 2000 DARPA Information Survivability Conference and Exposition*, January 2000.) In this dataset, each event to be monitored is a network connection, and the resources subject to an intrusion are mainly the network services (e.g., http, smtp, etc.) and system programs on a particular host in the network. The taxonomy described in Table 1 is used to first categorize the attacks occurring in the dataset based on their attack results: (1) illegal root access "ROOT," (2) illegal user access is obtained from outside "R2L," (2) denial-of-service is accomplished "DOS," and (4) information about the target is obtained "PROBE." Then within each of these categories, the attacks may be further partitioned by the techniques used to execute the attack. The ordering of sub-categories is of increasing complexity of the attack method. Attacks of each sub-category may be further partitioned according to the attack targets.

When measuring cost factors, only individual attacks are detectable by IDS. For example, a coordinated attack that involves port-scanning a network, gaining user-level access to the network illegally, and finally acquiring root access, would normally be detected and responded to by an IDS as three separate attacks because most IDSs are designed to respond quickly to events occurring in real-time. Therefore, the attacks are measured individually.

A first cost factor is damage cost (DCost). There are several factors that determine the damage cost of an attack. Criticality and lethality are used to quantify the damage that may be incurred by some intrusive behavior (further details are described in S. Northcutt, *Intrusion Detection: An Analyst's Handbook*, New Riders, 1999, pp. 39-40. "Criticality" measures the importance, or value, of the target of an attack. This measure can be evaluated according to a resource's functional role in an organization or its relative cost of replacement, unavailability, and disclosure (further details are described in D. Denning, *Information Warfare and Security*, Addison Wesley, 1999, pp. 23-25, and 385-388, which are incorporated by reference in their entirety herein). According to the classification taxonomy, 5 points are assigned for firewalls, routers, or DNS servers; 4 points for mail or Web servers; 2 points for UNIX workstations; and 1 point for Windows or MS-DOS workstations. "Lethality" measures the degree of damage that could potentially be caused by some attack. For example, a more lethal attack that helped an intruder gain root access would have a higher damage cost than if the attack gave the intruder local user access. Other damage may include the discovery of knowledge about network infrastructure or preventing the offering of some critical service. For each main attack category in Table 1, a relative lethality scale is defined, which is used as the base damage cost, or $base_D$. The attack target dimension is also used to assign damage cost according to the criticality of the target, or criticality. (The term DCost is used in Table 1 for criticality as used in equation [1] and [2], below.) Using these metrics, the damage cost of an attack targeted at some resource is expressed in equation [1]:

$$DCost = criticality \times base_D. \quad [1]$$

For example, a Denial-of-Service attack targeted at a firewall has DCost=150, where criticality=30 (3.1 and 3.2 of Table 1) and $base_D$=5 (for a firewall). The same attack targeted at a Unix workstation has DCost=60, where criticality=30 (3.1 and 3.2 of Table 1) and $base_D$=2 (for a UNIX workstation).

In another embodiment, the "progress" of an attack is considered in addition to criticality and lethality. Progress is defined to be a measure of how successful an attack is in achieving its goals. For example, a Denial-of-Service attack via resource or bandwidth consumption (e.g., SYN flooding, e.g., when an attacker attempts to initiate an excessive number of connections to a listening TCP port, but does not completely initiate those connections. This attack effectively exhausts the resources of the server, creating a Denial-of-Service) may not incur damage cost until it has progressed to the point where the performance of the resource under attack is starting to suffer. The progress measure can be used as an estimate of the percentage of the maximum damage cost that should be accounted for. That is, the actual damage cost is alternatively expressed in equation [2]:

$$DCost = progress \times criticality \times base_D. \quad [2]$$

In deciding whether or not to respond to an attack, it is necessary to compare the maximum possible damage cost with the response cost. This requires a worst-case scenario in which progress=1.0.

A second cost factor is response cost (RCost), which depends primarily on the type of response mechanisms being used. This is usually determined by an IDS's capabilities, site-specific policies, attack type, and the target resource (further details are described in R. Bace, Intrusion Detection, Macmillan Technical Publishing, 2000, pp. 237-238, which are incorporated by reference in their entirety herein). Responses may be either automated or manual, and manual responses will clearly have a higher response cost.

Responses to attacks that may be automated include the following: termination of the offending connection or session (e.g., halting a process or resetting a network connection), implementation of a packet-filtering rule, rebooting the targeted system, or recording the session for evidence gathering purposes and further investigation. In addition to these responses, a notification may be sent to the administrator of the offending machine via e-mail in case that machine was itself compromised.

Additional manual responses to an attack may involve further investigation (perhaps to eliminate action against false positives), identification, containment, eradication, and recovery. The cost of manual response includes the labor cost of the response team, the user of the target, and any other personnel that participate in response. It also includes any downtime needed for repairing and patching the targeted system to prevent future damage.

The relative complexities of typical responses to each attack are estimated in Table 1 in order to define the relative base response cost, or $base_R$. (Table 1 uses the term RCost to describe base cost, $base_R$.) Attacks with simpler techniques (i.e., sub-categories x.1 in the taxonomy of Table 1) generally have lower response costs than more complex attacks (i.e., sub-categories x.2 in Table 1), which require more complex mechanisms for effective response.

A third cost factor is operational cost (OpCost). A significant cost inherent in the operation of an IDS is the amount of time and computing resources needed to extract and test features from the raw data stream that is being monitored. (For simplicity, the discussion of personnel cost involved in administering and maintaining an IDS is omitted from this discussion.) Operational cost is associated with time because a real-time IDS must detect an attack while it is in progress and generate an alarm as quickly as possible so that damage can be minimized. A slower IDS which use features with higher computational costs would therefore be penalized. Even if a computing resource has a "sunken cost" (e.g., a dedicated IDS box has been purchased in a single payment), some cost is assigned to the expenditure of its resources as they are used. If a resource is used by one task, it may not be used by another task at the same time. The cost of computing resources is therefore an important factor in prioritization and decision making.

Some features cost more to gather than others. However, costlier features are often more informative for detecting attacks. For example, features that examine events across a larger time window have more information available and are often used for "correlation analysis" (Further details of correlation analysis are provided in E. Amoroso, *Intrusion Detection: An Introduction to Internet Surveillance, Correlation, Traps, Trace Back, and Response*, Intrusion.Net Books, 1999. pp 145-167, which are incorporated by reference in their entirety herein) in order to detect extended or coordinated attacks such as slow host or network scans (Further details of slow host and network scans are described in R. Bace, *Intrusion Detection*, Macmillan Technical Publishing, 2000, p. 156, which is incorporated by reference in its entirety herein.) Computation of these features is costly because of their need to store and analyze larger amounts data.

Predictive features useful for classifying attacks may be grouped into several relative levels, based on their computational costs. In the exemplary embodiment, predictive features are grouped into three levels:

Level 1 features are computed using a small amount of information available at the beginning of an event. For example, the "destination service" can be determined using the first packet of a connection.

Level 2 features are computed at any point during an event, and are maintained throughout the event's duration. For example, the "number of data bytes from the source to the destination" is such a feature.

Level 3 features are computed using information from several events within a given time window. For example, the feature measuring "the percentage of connections in the past five seconds that are to the same destination host as the current connection and are half-open" can be computed by examining all the connections of the past five seconds and may help detect SYN-flooding.

Relative magnitudes are assigned to these features according to their computational costs. For example, Level 1 features may be assigned Opcost=1 or 5, Level 2 features may be assigned Opcost=10, and Level 3 features may be assigned Opcost=100. These estimations have been verified empirically using a prototype system for evaluating the intrusion detection models in real-time that has been built in coordination with Network Flight Recorder (Network Flight Recorder Inc., "Network Flight Recorder," http://www.nfr.com, 1997.

A cost model formulates the total expected cost of intrusion detection. It considers the trade-off among all relevant cost factors and provides the basis for making appropriate cost-sensitive detection decisions. The cost trade-off is examined regarding each possible outcome of observing some event e, which may represent, e.g., a network connection, a user's session on a system, or some logical grouping of activities being monitored, etc. The event e is denoted by e=(a, p, r) having an attack type a (which can be normal for a truly normal event), the progress p of the attack, and the target resource r. (Progress p may be determined by the duration of the attack, and target resource r is the destination of the attack, or the service that is being exploited.) The detection outcome of e is one of the following: false negative (FN), false positive (FP), true positive (TP), true negative (TN), or misclassified hit. (Such values may be determined in offline analysis after an attack has completed.) The costs associated with these outcomes are known as consequential costs ("CCost"), as they are incurred as a consequence of a prediction of outcome, and are outlined in Table 2.

FN CCost is the cost of not detecting an attack by an IDS, and may also be incurred by systems that do not install IDSs. In the former case, the IDS incorrectly determines that a connection is not an attack and does not respond to the attack. Therefore, the response cost associated with event e, RCost(e)=0. By failing to detect the attack, the attack may succeed and the target resource may be damaged. The FN CCost(e) is therefore defined as the damage cost associated with event e, or DCost(e). (DCost may be chosen from Table 1 or computed from equations [1] or [2] above, depending upon the information that is available.)

TP CCost is incurred in the event of a correctly classified attack. To determine whether a response will be taken, both response cost associated with event e, RCost(e) and damage cost DCost(e) must be considered. If the damage done by the attack to resource r, is less than the resources expended detecting the attack and possibly responding to it, then ignoring the attack actually produces a lower overall cost. Therefore, if RCoste(e)>DCost(e), the attack is not responded to beyond simply logging its occurrence, and the loss is DCoste(e). However, if RCost(e)≦DCoste(e), then the attack is acted upon, and the loss may be limited to RCost(e). In reality, however, by the time an attack is detected and a response ensues, some damage may have incurred. To account for this, TP CCost(e) may be defined as $RCost(e) + \epsilon_1 DCost(e)$, where $\epsilon_1 \in [0, 1]$ as a function of the progress p of the attack, where an early stage of the attach defines $\epsilon_1 = 0$, and a substantially complete attack defines $\epsilon_1 = 1$.

FP CCost is incurred when a normal event is incorrectly classified as an attack, a false alarm. For example, a FP outcome may occur when e=(normal, p, r) is misidentified as e'=(a, p', r) for some attack a. If RCost(e')≦S DCost(e), a response will ensue and the response cost, RCost(e'), must be accounted for as well. Also, since normal activities may be disrupted due to unnecessary response, false alarms should be penalized. The term PCost(e) represents the penalty cost of treating a legitimate event e as an attack. For example, if e is aborted, PCost(e) can be the damage cost of a Denial-of-Service attack on resource r, because a legitimate user may be denied access to r.

TN CCost is zero, as it is incurred when an IDS correctly decides that an event is normal. Therefore, no cost is dependent on the outcome of the decision.

TABLE 2

| Outcome | Consequential Cost CCost(e) | Condition |
|---|---|---|
| Miss (False Negative, FN) | DCost(e) | |
| False Alarm (False Positive, FP) | RCost(ê) + PCost(e) | if DCost(ê) ≧ RCost(ê) or |
| | 0 | if DCost(ê) < RCost(ê) |

TABLE 2-continued

| Outcome | Consequential Cost CCost(e) | Condition |
| --- | --- | --- |
| Hit (True Positive, TP) | RCost(e) + $\epsilon_1$ DCost(e), $0 \leq \epsilon_1 \leq 1$ DCost(e) | if DCost(e) < RCost(e) or if DCost(e) < RCost(e) |
| Normal (True Negative, TN) | 0 | |
| Misclassified Hit | RCost(é) + $\epsilon_2$DCost(e), $0 \leq \epsilon_2 \leq 1$ DCost(e) | if DCost(é) $\geq$ RCost(é) or if DCost(é) < RCost(é) |

Misclassified Hit CCost is incurred when the wrong type of attack is identified, e.g., an event e=(a, p, r) is misidentified as e'(a', p',r). If RCost(e')≦DCost(e'), a response will ensue and RCost(e') needs to be accounted for. Since the response taken is effective against attack type á rather than a, some damage cost of $\epsilon_2$DCost(e) will be incurred due to the true attack. Here $\epsilon_2 \in [0, 1]$ is a function of the progress p and the effect of the response intended for á on a.

The cost model for an IDS is defined herein. When evaluating an IDS over some labeled test set E, where each event, e∈E, has a label of normal or one of the intrusions, the cumulative cost of the IDS is defined by equation [3]:

$$CumulativeCost(E) = \sum_{e \in E} (CCost(e) + OpCost(e)) \qquad [3]$$

where CCost(e), the consequential cost of the prediction by the IDS on e, is defined in Table 2.

It may not always be possible to fold damage cost DCost and response costs RCost into the same measurement unit. Instead, each should be analyzed in its own relative scale. However, to compute CCost(e) for use in the calculation of CumulativeCost in equation [3], such costs must be compared and then combined. One approach is to decide first under which conditions not to respond to particular attacks. For example, assuming that probing attacks should not be responded to and that the damage cost for probing is 2, then the response cost for probing must be greater, say, 20. Similarly, if the attack type with the lowest damage cost should not be ignored, then the corresponding lowest response cost should be a smaller value. Once a starting value is defined, remaining values can be computed according to the relative scales as discussed above.

OpCost(e) in equation [3] can be computed as the sum of the computational costs of all the features used during rule checking. Since OpCost(e) and CCost(e) use two different measurement units, equation [3] may be used at a conceptual level. That is, when evaluating IDSs, both the cumulative OpCost and cumulative CCost are both considered, but actual comparisons are performed separately using the two costs. This inconvenience cannot be overcome easily unless all cost factors can be represented using a common measurement unit, or there is a reference or comparison relation for all the factors. Site-specific policies can be used to determine how to uniformly measure these factors.

Cost-sensitive modeling for intrusion detection is performed periodically because cost metrics must take into account changes in information assets and security policies. The invention described herein automatically produces cost-sensitive models for given cost metrics.

In order to reduce OpCost, intrusion detection models need to use low cost features as often as possible while maintaining a desired level of accuracy. The approach in accordance with the invention is to build multiple intrusion detection models, each of which uses different sets of features at different cost levels. Low cost models are always evaluated first by the IDS, and higher cost models are used only when the low cost models are not able to make a prediction with sufficient accuracy. This multiple-model approach may implemented using RIPPER, a rule induction algorithm described in W. W. Cohen. "Fast Effective Rule Induction," *Machine Learning: the 12th International Conference*, Lake Taho, Calif., 1995. Morgan Kaufmann, which is incorporated by reference in its entirety herein. However, other machine learning algorithms or knowledge-engineering methods are also useful. Another example of a machine learning algorithm suitable for this task is C4.5, described in Quinlan, J. R. 1993. "C4.5: Programs for Machine Learning". San Mateo: Morgan Kaufmann, which is incorporated by reference in its entirety herein. Neural networks or Baysean Networks are also suitable for this purpose. The term rule is used herein. It is understood that "rule" can also refer to a signature, or a decision process that tests conditions and causes an action or an alert.

Given a training set in which each event is labeled as either normal or as an attack, RIPPER builds an "ordered" or "unordered" rule set. Each rule in the rule set uses the most discriminating feature values for classifying a data item into one of the classes. A "rule" consists of conjunctions of feature comparisons, and if the rule evaluates to "true," then a prediction is made. An exemplary rule for predicting teardrop, a Denial-of-Service intrusion that exploits a vulnerability in early versions of Microsoft Windows OS (described in CERT, "CERT® Advisory CA-1997-28 IP Denial-of-Service Attacks," on-line publication http://www.cert.org/advisories/CA-1997-28.html), is "if number_bad_fragments≦2 and protocol=udp then teardrop Some advantages and disadvantages of ordered and un-ordered rule sets is discussed below.

An "ordered" rule set has the form if $r_1$ then $i_1$ elseif $r_2$ then $i_2$, ..., else default  [4]

where $r_n$ is a rule and $i_n$ is the class label predicted by that rule. Before learning, RIPPER first orders the classes by one of the following heuristics: +freq, which orders classes by increasing frequency in the training data; −freq, which orders classes by decreasing frequency; given, which is a user-defined ordering of classes; and mdl, which uses the minimal description length to guess an optimal ordering of classes (as described in T. Mitchell. *Machine Learning*. McGraw-Hill, 1997 pp. 171-174, which is incorporated by reference in its entirety herein.) After arranging the classes, RIPPER finds rules to separate $class_1$ from the remaining classes $class_2$, ..., $class_n$, then rules to separate $class_2$ from the remaining classes $class_3$, ..., $class_n$, and so on. The final class, $class_n$, becomes the default class. The end result is that rules for a single class will always be grouped together, but rules for $class_t$ are possibly simplified, because they can assume that the class of the example is one of $class_t$, ..., $class_n$. If an example is covered by rules from two or more classes, this conflict is resolved in favor of the class that comes first in the ordering.

An ordered rule set is usually succinct and efficient. Evaluation of an entire ordered rule set does not require each rule to be tested, but proceeds from the top of the rule set to the bottom until any rule evaluates to true. The features used by each rule can be computed one by one as evaluation proceeds. The operational cost to evaluate an ordered rule set for a given event is the total cost of computing unique features until a predicting is made. For intrusion detection, a −freq rule set is usually lowest in operational cost and accurately classifies normal events. This is because the first rules of the rule set identify normal operation, which is typically the most frequently occurring class. On the other hand, a +freq rule set would most likely be higher in operational cost but more accurate in classifying attacks because the rule set partitions attacks from normal events early in its evaluation, and normal is the final default classification. Depending on the class ordering, the performances of given and mdl will lie between those of −freq and +freq.

An "un-ordered" rule set has at least one rule for each class and there are usually many rules for frequently occurring classes. There is also a default class which is used for prediction when none of these rules are satisfied. The following is an example:

if $A \hat{\ } B$ then $i_1$ (0.99); if C then $i_2$ (0.98); . . . ; default $i_k$ [5]

Unlike ordered rule sets, all rules are evaluated during prediction and conflicts are broken by using the most accurate rule. It is possible to convert any un-ordered rule set into a logically equivalent ordered one by ordering all rules by decreasing precision and then altering into ordered form by removing the precisions. This process will not affect the logic since if an early rule (with high precision) is satisfied, there is no utility in checking later rules with lower precision. Considering the above mentioned rule set, it can be changed it into an equivalent ordered form if $A \hat{\ } B$ elseif C then $i_2$ elseif . . . . Un-ordered rule sets, in general, contain more rules and are less efficient in execution than −freq and +freq ordered rule sets, but there are usually several rules of high precision for the most frequent class, normal, resulting in accurate classification of normal events.

In order to reduce both operational cost and response cost, the detection model needs to use low cost features as often as possible while maintaining a desired accuracy level. The method includes steps to build an operational cost-sensitive n-step sequential ensemble. This ensemble is made of n classifiers; each one uses features of different cost levels. Low cost classifiers are always evaluated first at prediction time; and high cost classifiers are used only when the low cost classifiers cannot predict with sufficient accuracy.

First n feature subsets are generated, where $f_1 \subset \ldots \subset f_n$, cost $(f_1) < \ldots < $ cost $(f_n)$, and $f_n$ is the full feature set. The cost of a feature set, cost $(f_1)$, is the total cost to calculate or acquire every feature in that feature set. The choice of these feature subsets is based on the following guidelines: (1) Features that can be acquired in the same time should be grouped into the same subset; otherwise, additional time is spent computing more features. (2) Features with similar costs should be grouped into the same subset, thus making the operational costs of different feature subsets significantly different. This will help reduce the expected operational cost if the earlier hypotheses have good accuracy on some instances.

Once the features are distributed into nested feature subsets, the rules, or hypotheses, $r_1, \ldots, r_n$ are computed from $f_1, \ldots, f_n$. During prediction, all the features in $f_1$ are evaluated and predicted with $r_1$. If the prediction does not meet the desired level of accuracy, the additional features in $f_2 - f_1$ are tested and $r_2$ is evaluated. Such a procedure is iterated until either a desired accuracy is reached or the classifier that uses all available features, $r_n$, is evaluated.

As illustrated in FIG. 1, a first stage 100 of the technique in accordance with the invention is the training of data, which typically does not occur in real-time.

As an early stage of the procedure, multiple training sets $T_1, \ldots, T_n$ are generated using feature subsets $f_1, \ldots, f_n$ respectively, where $f_1 \subset \ldots \subset f_n$ and cost $(f_1) < \ldots < $ cost $(f_n)$, at step 110. In the exemplary embodiment, training sets $T_1$, $T_2$, $T_3$, $T_4$ are generated. (Four training sets are used in the exemplary embodiment as there are four levels of OpCost for the features used by each event in the training sets. Each element may represent a connection record and contains feature values describing that connection. A greater or fewer number of training sets may be used in accordance with the invention described herein.) Training sets are ordered by increasing operational costs. In the exemplary embodiment, training set $T_1$ uses only Level 1, OpCost=1 features; Training set $T_2$ uses Level 1 features of OpCosts 1 and 5; $T_3$ uses Level 1 and 2 features of OpCosts 1, 5 and 10; and $T_4$ uses Level 1, 2 and 3 features of OpCosts 1, 5, 10 and 100. The OpCost of each feature was chosen by analyzing the complexity of the computing of each feature.

Subsequently, rule sets $R_1, \ldots, R_n$ are learned using their respective training sets $T_1, \ldots, T_n$. In the exemplary embodiment, rule sets $R_1$, $R_2$, $R_3$, $R_4$ are learned using their respective training sets $T_1$, $T_2$, $T_3$, $T_4$ at step 120, by use of the RIPPER algorithm, as described above; other alternative machine learning algorithms may also be used, also described above. The Rule set $R_4$ is learned as either +freq or −freq rule set for efficiency, as it may contain the most costly features. $R_1$, $R_2$, $R_3$ are learned as either −freq or un-ordered rule sets, as they will contain accurate rules for classifying normal events. Thus, a −freq ruleset will contain rules for classifying "normal" as early as possible to reduce operational cost. The ordering schemes given and mdl may alternatively be used in the invention.

Next, at step 130, a precision measurement $p_r$ is computed for every prediction by the rules in rule sets $R_1, \ldots, R_{n-1}$ except for the predictions in rule set R. (No precision measurement is taken for $R_4$, because a prediction is always emitted after $R_4$ is evaluated.) Precision measurement $p_r$ describes the accuracy of a prediction. If P is the set of predictions with class label i and W is the set of instances with class label i in the data set, by definition, $$p = \frac{|P \cap W|}{|P|}$$

The precision of a rule can also be obtained easily from the positive p and negative n counts of a rule:

$$p_r = \frac{p}{p+n}.$$

For decisions trees, the positive and negative counts of the leaf can be used. For rule learning, the covered positive and negative examples for a rule can be calculated. For probabilistic methods, the posterior probability can be used.

A threshold value $\tau_i$ is determined for every class i at step 140, which represents the minimum tolerable precision for a prediction or classification to be made by any hypothesis or rule in each rule set, except for rule set $R_4$. Threshold values are set to the precisions of the rules in a single rule set using all features ($R_n$) for each class in the chosen dataset, as it is undesirable to make less precise classifications in $R_1, \ldots,$ $R_{n-1}$ than would be made using $R_n$. The threshold value $\tau_i$ will, on average, ensure that the predictions emitted by the previous hypothesis are at least as accurate as using $R_n$ alone. The motivation for using the precision of the final ruleset $R_n$ to define the threshold $\tau_i$ is that this final ruleset $R_n$ uses all available features and the precision of each rule is equivalent to that of a single model. Thus, by using its precision values to set the threshold $\tau_i$, we are ensuring that predictions by $R_1, \ldots, R_{n-1}$ will only be made if they will be at least as accurate as $R_n$. Since it is often the case that $R_1, \ldots, R_{n-1}$ (which use less costly features) can predict as accurately as $R_n$; this is the main reason for the savings in overall operational cost.

Figure 2:
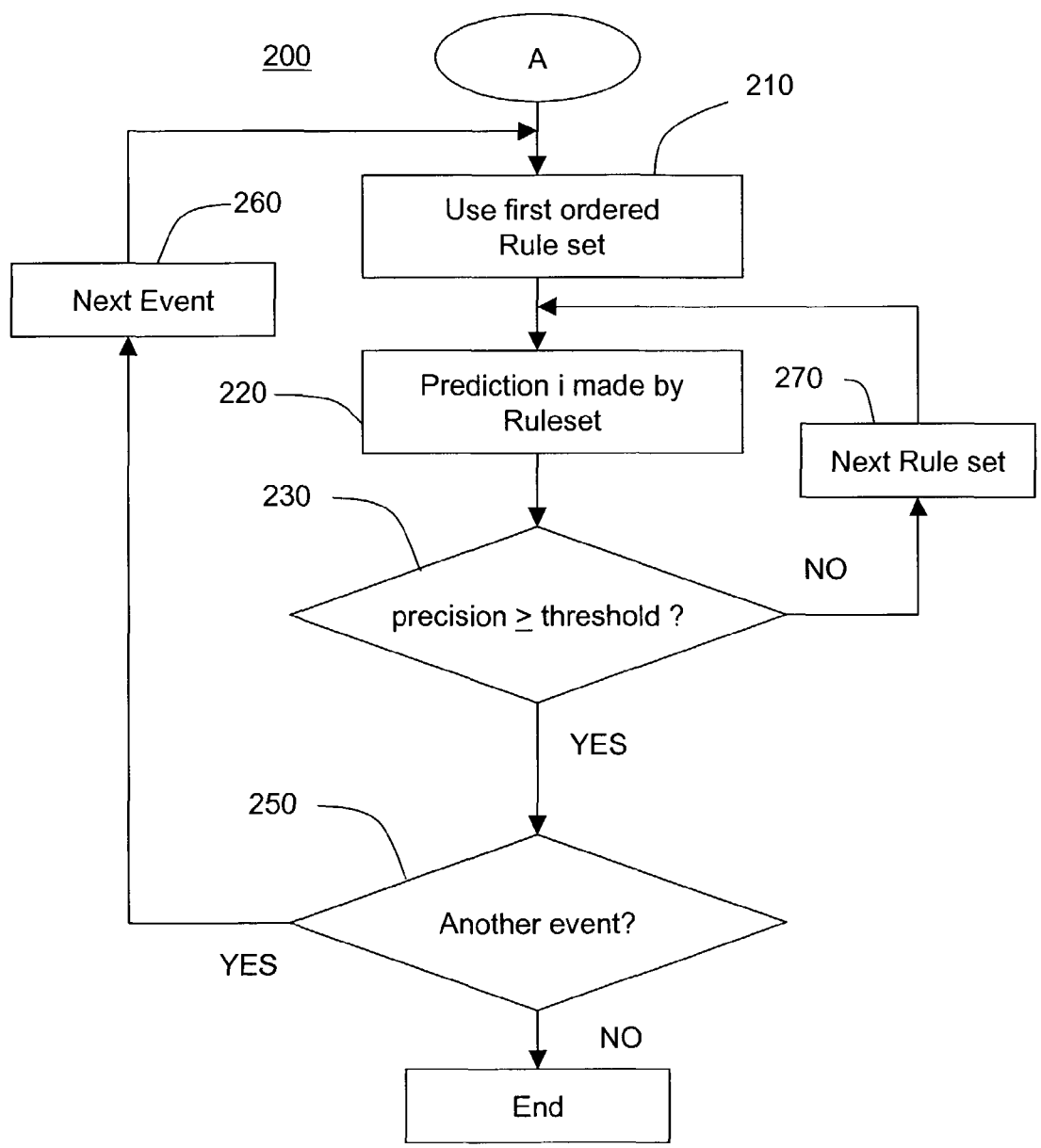
FIG. 2 is a flow chart representing another portion of the process in accordance with the present invention.

As illustrated in FIG. 2, a second stage 200 of the process of feature computation and rule evaluation is a real-time, or near real-time execution, which proceeds as follows:

At step 210, the first ordered rule set $R_1$, which includes the subset of features $f_1$ having the lowest operational costs is selected. At step 220, all features $f_1$ are computed, the rules in rule set $R_1$ are evaluated and a prediction or class i is determined by one or more rule r in $R_1$. Rulesets are evaluated against each item in the data. Each item in the data set is a vector of feature values (feature values are described in greater detail in U.S. Provisional Application 60/328,682, filed Oct. 11, 2001, entitled "Method and Apparatus for Combining Multiple Models for Intrusion Detection System," which is incorporated by reference in its entirety herein). A prediction i is either "normal" or a specific attack type describing the connection.

A next stage, step 230, is to determine whether the precision measurement is greater than or equal to the tolerance level, $p_r \geq \tau_i$. If $p_r \geq \tau_i$, the prediction i is considered final. In this case, no more features are computed and the system determines whether there is another event, step 250, and, if so, examines the next event, step 260. Otherwise, the next rule set, e.g., $R_2$, is selected at step 270, and any additional features $(f_2-f_1)$ required by $R_2$ are computed and $R_2$ is to be evaluated to the same event e, at step 220. This process continues with $R_3$, etc., until a final prediction is made. The evaluation of $R_4$ always produces a final prediction because $R_4$ uses all features.

The precision and threshold values used by the multiple model approach can be obtained during model training from the training set, or can be computed using a separate hold-out validation set.

A traditional IDS that does not consider the trade-off between RCost and DCost will attempt to respond to every attack that it detects. As a result, the consequential cost for FP, TP, and misclassified hits will always include some response cost. A cost-sensitive decision module is used to determine whether response should ensue based on whether DCost is greater than RCost.

The detection module takes as input the data items described above and outputs an attack report, which contains all data items that were determined by the model to be not "normal", along with a prediction for each data item. The report contains the name of the predicted attack and the name of the target, which are then used to look up the pre-determined DCost and RCost. The decision module takes as input an attack report generated by the detection module. If DCost≧RCost, the decision module invokes a separate module to initiate a response; otherwise, it simply logs the attack report.

Figure 3:
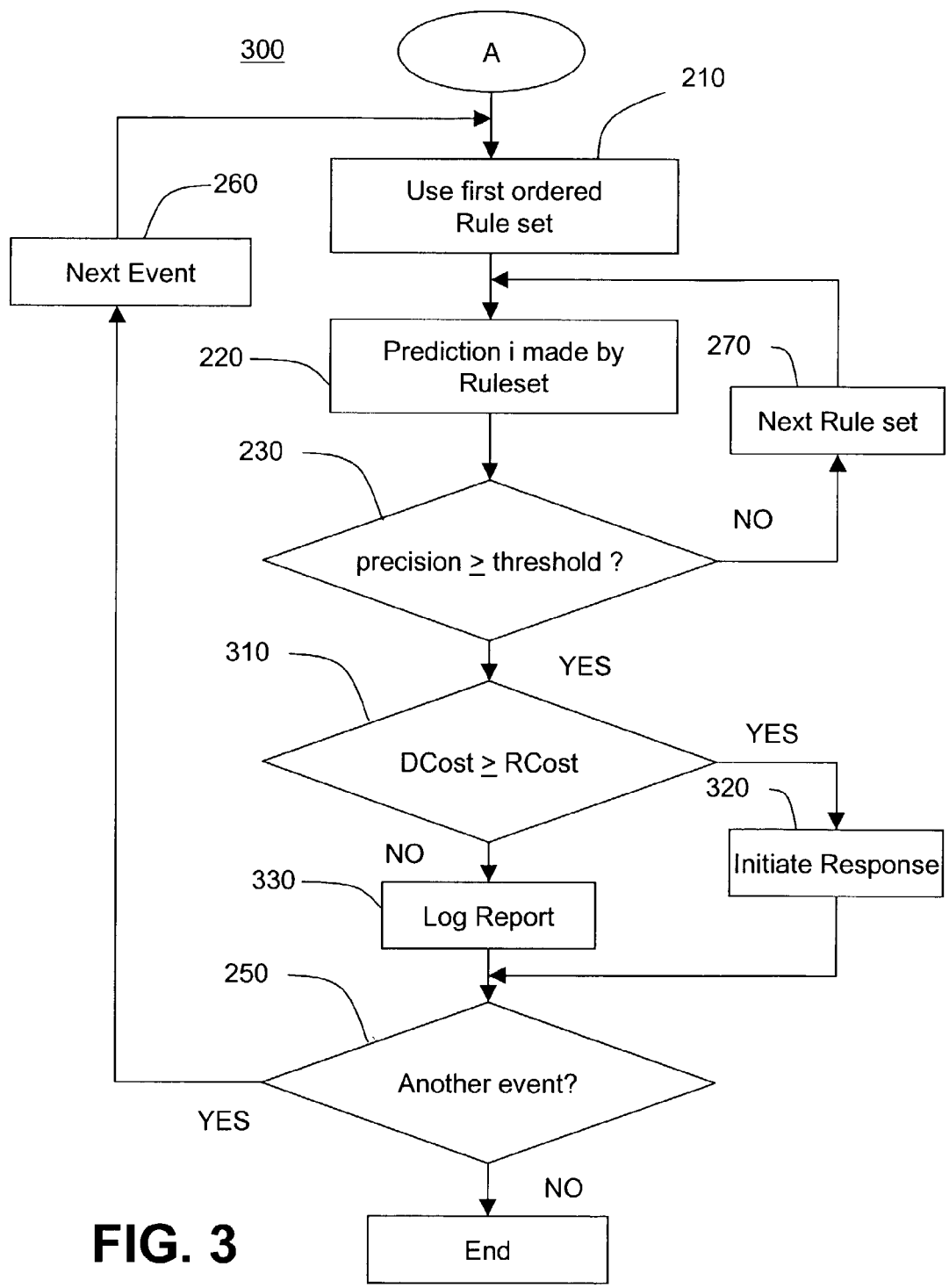
FIG. 3 is a flow chart representing another embodiment of the process in accordance with the present invention.

The functionality of the decision module can be implemented before training using some data re-labeling mechanism such as MetaCost (as described in P. Domingos, "Metacost: A General Method for Making Classifiers Cost-Sensitive," *Proceedings of the 5<sup>th</sup> ACM SIGKDD International Conference on Knowledge Discovery & Data Mining (KDD-*99), August 1999) which will re-label attacks with DCost<RCost to normal so that the generated model will not contain rules for predicting these attacks at all. In the exemplary embodiment 300, this functionality is implemented in a post-detection decision module 310 to eliminate the necessity of re-training a model when cost factors change, despite the savings in operational cost due to the generation of a smaller model. (FIG. 3.) DCost as discussed above, may be determined based on the technique used for the attack (see, e.g., Table 1), the criticality of the system being attacked, and the progress of the attack. RCost as discussed above, may be determined based on the technique used for the attack (see, e.g., Table 1) and the operation used to respond to the attack. Thus, if DCost≧RCost, then a separate module is invoked to initiate a response 320. Otherwise, an attack report is logged at step 330.

Experiments which were performed to evaluate the method use data that were distributed by the 1998 DARPA Intrusion Detection Evaluation Program. The data were gathered from a military network with a wide variety of attacks injected into the network over a period of seven weeks. The details of the data mining framework for data pre-processing and feature extraction is described in W. Lee, S. J. Stolfo and K. W. Mok, "A Data Mining Framework for Building Intrusion Detection Models," *Proceedings of the* 1999 *IEEE Symposium on Security and Privacy*, May 1999, which is incorporated by reference in its entirety herein.) Eighty percent of the data were used for training the detection models. The remaining 20% were used as a test set for evaluation of the cost-sensitive models. The training set was also used to calculate the precision of each rule and the threshold value for each class label.

Expected operational and consequential costs were measured in the experiments. The expected average operational cost per event e over the entire test set S is defined as:

$$OpCost(e) = \frac{\sum_{e \in S} OpCost(e)}{|s|} \quad [6]$$

In all of the reported results, OpCost(e) is computed as the sum of the feature computation costs of all unique features used by all rules evaluated until a prediction is made for event e. If any Level 3 features (of cost 100) are used at all, the cost is counted only once. This is done because a natural optimization of rule evaluation is to compute all statistical and temporal features in one iteration through the event database.

For each event in the test set, its CCost is computed as follows: the outcome of the prediction (i.e., FP, TP, FN, TN, or misclassified hit) is used to determine the corresponding conditional cost expression in Table 2; the relevant RCost, DCost, and PCost are then used to compute the appropriate CCost. The CCost for all events in the test set are then summed to measure total CCost. In all experiments, both $\epsilon_1=0$ and $\epsilon_2=1$ were evaluated in the cost model of Table 2. Setting $\epsilon_1=0$ corresponds to the optimistic belief that the correct response will be successful in preventing damage. Setting $\epsilon_2=1$ corresponds to the pessimistic belief that an incorrect response does not prevent the intended damage at all.

TABLE 3

Average OpCost Per Connection

|  | − | ±±− | ---- | + | ±±+ | ---+ |
|---|---|---|---|---|---|---|
| OpCost | 128.70 | 48.43 | 42.29 | 222.73 | 48.42 | 47.37 |
| % rdc | N/A | 56.68% | 67.14% | N/A | 78.26% | 78.73% |

TABLE 4

| | | CCost Comparison | | | | | |
|---|---|---|---|---|---|---|---|
| Model Format | | − | ±±±− | − − − − | + | ±±±+ | − − −+ |
| Cost Sensitive | CCost | 25776 | 25146 | 25226 | 24746 | 24646 | 24786 |
| | % rdc | 87.8% | 92.3% | 91.7% | 95.1% | 95.8% | 94.8% |
| Cost Insensitive | CCost | 28255 | 27584 | 27704 | 27226 | 27105 | 27258 |
| | % rdc | 71.4% | 75.1% | 74.3% | 77.6% | 78.5% | 77.4% |
| % err | | 0.193% | 0.165% | 0.151% | 0.085% | 0.122% | 0.104% |

In all discussion of the results, the terminology +, − and ± are used to represent +freq, −freq and un-ordered rule sets, respectively. A multiple model approach is denoted as a sequence of these symbols. For example, − − − − represents a multiple model where all rule sets are −freq.

Table 3 shows the average operational cost per event for a single classifier approach ($R_4$ learned as − or +) and the respective multiple model approaches (± ± ± −, − − − − or ± ± ± +, − − − +). The first row below each method is the average OpCost per event and the second row is the reduction (% rdc) by the multiple model over the respective single model, $$\frac{Single - Multiple}{Single} \times 100\%.$$

As clearly shown in the table, there is always a significant reduction by the multiple model approach. In all four configurations, the reduction is more than 57% and − − − + has a reduction in operational cost by as much as 79%. This significant reduction is due to the fact that $R_1 \ldots R_3$ are very accurate in filtering normal events and a majority of events in real network environments (and consequently the test set) are normal. The multiple model approach computes more costly features only when they are needed.

CCost measurements are shown in Table 4. The Maximal loss is the cost incurred when always predicting normal, or $\Sigma DCost_i$. This value is 38256 for the test set. The Minimal loss is the cost of correctly predicting all connections and responding to an attack only when $DCost(i) \geq RCost(i)$. This value is 24046 and it is calculated as $\Sigma_{DCost(i) < RCost(i)} DCost(i) + \Sigma_{DCost(j) \geq RCost(j)} RCost(j)$. A reasonable method will have a CCost measurement between Maximal and Minimal losses. Reduction is defined as $$\%rdc = \frac{Maximal - CCost}{Maximal - Minimal} \times 100\%$$

to compare different models. As a comparison, the results of both "cost sensitive" and "cost insensitive" methods are shown. A cost sensitive method only initiates a response if $DCost \geq RCost$, and corresponds to the cost model in Table 2. A cost insensitive method, on the other hand, responds to every predicted attack and is representative of current brute-force approaches to intrusion detection. The last row of the table shows the error rate (% err) of each model.

As shown in Table 4, the cost sensitive methods have significantly lower CCost than the respective cost insensitive methods for both single and multiple models. The reason is that a cost sensitive model will only respond to an attack if its response cost is lower than its damage cost. The error rates for all six models are very low (<0.2%) and very similar, indicating that all models are very accurate. however, there is no strong correlation between error rate and CCost, as a more accurate model may not necessarily have detected more costly attacks. There is little variation in the total CCost of single and multiple models in both cost-sensitive and cost-insensitive settings, showing that the multiple model approach, while decreasing OpCost, has little effect on CCost. Taking both OpCost and CCost into account (Tables 3 and 4), the highest performing model is − − − +.

It will be understood that the foregoing is only illustrative of the principles of the invention, and that various modifications can be made by those skilled in the art without departing from the scope and spirit of the invention.

APPENDIX

The following files are included in the accompanying CD and are incorporated by reference in their entirety herein.

| Name | Modified | Size | Ratio | Packed | Path |
|---|---|---|---|---|---|
| ConvertToNoise.awk | Jul. 18, 2000 3:06 P.M. | 99 | 0% | 99 | |
| ConvertToNoiseAccordingToPrecision.awk | Jul. 6, 2000 10:56 A.M. | 322 | 0% | 322 | |
| ConvertToNormal.awk | Jul. 20, 2000 1:51 P.M. | 100 | 0% | 100 | |
| DuplicatePN.awk | May 1, 2000 6:25 P.M. | 729 | 0% | 729 | |
| FeatureSummary.awk | Feb. 4, 2000 2:39 P.M. | 171 | 0% | 171 | |
| FeatureValue.awk | Feb. 3, 2000 10:55 A.M. | 158 | 0% | 158 | |
| GenNormalNoise.awk | Feb. 3, 2000 1:28 P.M. | 81 | 0% | 81 | |
| HypothesisCost.awk | May 1, 2000 6:05 P.M. | 831 | 0% | 831 | |
| ReplaceDefault.awk | Jul. 21, 2000 11:17 A.M. | 158 | 0% | 158 | |
| ReplaceDefaultToNormal.awk | Jul. 20, 2000 12:48 P.M. | 160 | 0% | 160 | |
| ReplaceWithNoise.awk | Feb. 14, 2000 6:53 P.M. | 201 | 0% | 201 | |
| SegmentIDS.awk | Feb. 2, 2000 11:27 P.M. | 142 | 0% | 142 | |
| SegmentNormal.awk | Feb. 9, 2000 10:37 P.M. | 309 | 0% | 309 | |
| SegmentNormalNew.awk | Feb. 10, 2000 11:32 A.M. | 122 | 0% | 122 | |

-continued

| Name | Modified | Size | Ratio | Packed | Path |
|---|---|---:|---:|---:|---|
| analyzenormal.awk | Feb. 9, 2000 11:29 A.M. | 94 | 0% | 94 | |
| anomaly_matrix.awk | Feb. 16, 2000 12:12 P.M. | 1,422 | 0% | 1,422 | |
| anomaly_matrix_new.awk | Feb. 21, 2000 4:15 P.M. | 5,490 | 0% | 5,490 | |
| anomaly_summary.awk | Feb. 12, 2000 11:50 P.M. | 2,440 | 0% | 2,440 | |
| anomaly_summary_no_title.awk | Feb. 12, 2000 10:49 P.M. | 738 | 0% | 738 | |
| anomaly_table.awk | Feb. 23, 2000 11:03 P.M. | 6,736 | 0% | 6,736 | |
| anomaly_table_anomly_only.awk | Feb. 27, 2000 12:20 A.M. | 8,230 | 0% | 8,230 | |
| anomaly_table_normal.awk | Feb. 26, 2000 1:40 P.M. | 6,736 | 0% | 6,736 | |
| avg.awk | Jan. 27, 2000 4:42 P.M. | 614 | 0% | 614 | |
| avg_comb.awk | Jan. 5, 2000 3:58 P.M. | 649 | 0% | 649 | |
| avg_comb_meta.awk | Jan. 5, 2000 4:07 P.M. | 649 | 0% | 649 | |
| avg_comb_nometa.awk | Jan. 5, 2000 4:08 P.M. | 651 | 0% | 651 | |
| cost_matrix_analysis.awk | Dec. 12, 1999 1:20 P.M. | 264 | 0% | 264 | |
| data_stats.awk | Dec. 8, 1999 1:17 P.M. | 223 | 0% | 223 | |
| each_rule_feature.awk | Jan. 27, 2000 3:02 P.M. | 197 | 0% | 197 | |
| featureCumulative.awk | Jan. 27, 2000 4:32 P.M. | 671 | 0% | 671 | |
| filter_noise.awk | Feb. 17, 2000 7:02 P.M. | 433 | 0% | 433 | |
| fired_at_which_classifier.awk | Mar. 16, 2000 9:38 P.M. | 602 | 0% | 602 | |
| gen_boost_init_data_11.awk | Dec. 12, 1999 4:57 P.M. | 1,213 | 0% | 1,213 | |
| gen_boost_init_data_awk.awk | Dec. 12, 1999 4:57 P.M. | 260 | 0% | 260 | |
| gen_boost_init_data_uniform.awk | Dec. 23, 1999 3:45 P.M. | 1,189 | 0% | 1,189 | |
| gen_nomal_ids.awk | Dec. 26, 1999 11:47A.M. | 164 | 0% | 164 | |
| hyoCostNew.awk | Jan. 5, 2000 3:02 P.M. | 882 | 0% | 882 | |
| hypCost.awk | Dec. 27, 1999 9:31 P.M. | 882 | 0% | 882 | |
| hypCostCumulative.awk | Jan. 5, 2000 6:53 P.M. | 898 | 0% | 898 | |
| hypCostCumulative4Column.awk | Jan. 5, 2000 5:13 P.M. | 896 | 0% | 896 | |
| hypCostCumulativeDecrease.awk | Jan. 11, 2000 2:30 P.M. | 881 | 0% | 881 | |
| hypCostCumulativeDecrease4Column.awk | Jan. 11, 2000 2:32 P.M. | 879 | 0% | 879 | |
| hypCostUnordered.awk | Jan. 1, 2000 4:52 P.M. | 880 | 0% | 880 | |
| hypUnorderedSegmentation.awk | Jan. 1, 2000 5:08 P.M. | 1,211 | 0% | 1,211 | |
| label.awk | Feb. 14, 2000 10:50 P.M. | 76 | 0% | 76 | |
| make_names.awk | Dec. 24, 1999 2:26 P.M. | 658 | 0% | 658 | |
| nullservice.awk | Feb. 13, 2000 5:29 P.M. | 104 | 0% | 104 | |
| oneline.awk | Feb. 14, 2000 10:54 P.M. | 35 | 0% | 35 | |
| orderunordered.awk | Jan. 27,2000 10:47 A.M. | 1,234 | 0% | 1,234 | |
| rule_accuracy.awk | Dec. 31, 1999 10:51 A.M. | 186 | 0% | 186 | |
| rule_feature.awk | Jan. 5, 2000 9:15 P.M. | 118 | 0% | 118 | |
| rule_feature_cost.awk | Jan .5, 2000 4:01 P.M. | 1,459 | 0% | 1,459 | |
| tmp.awk | Feb .12, 2000 11:48 P.M. | 817 | 0% | 817 | |
| total.awk | Jun .25, 2000 5:22 A.M. | 6,736 | 0% | 6,736 | |
| total_incremental.awk | Jul .4, 2000 1:42 P.M. | 6,741 | 0% | 6,741 | |
| total_incremental_4C.awk | Jul .21, 2000 12:39 P.M. | 6,741 | 0% | 6,741 | |
| total_incremental debug.awk | Jul .4, 2000 1:51 P.M. | 6,865 | 0% | 6,865 | |
| intrusion_precision.script | Jul .20, 2000 3:50 P.M. | 1,236 | 0% | 1,236 | |
| intrusion_precision_4C.script | Jul.21, 2000 12:38 P.M. | 1,236 | 0% | 1,236 | |
| normal_precision.script | Jul. 4, 2000 1:37 P.M. | 741 | 0% | 741 | |
| test_incremental.script | Feb. 13, 2000 8:16 P.M. | 64 | 0% | 64 | |
| 61 file(s) | | 85,704 | 0% | 85,704 | |

What is claimed is:

1. A method of modeling a cost-sensitive intrusion detection model, comprising:
   (a) generating a training set of data suitable as input for machine learning, said training set of data comprising a set of features having associated costs;
   (b) automatically determining, using a computer programmed to do so, at least one model based on said training set of data using machine learning;
   (c) for each of a plurality of events, computing, using a computer programmed to do so, said set of features and predicting a class of said event using said at least one model;
   (d) determining a response cost to be incurred by a computer system in responding to an event predicted as an intrusion in (c), wherein said response cost is estimated based upon the resources of the computer system to be expended in responding to the event, and determining a damage cost for an event predicted as an intrusion in (c), wherein said damage cost is determined based on at least one of the group consisting of a technique of the intrusion, a criticality of a component of the computer system subject to the intrusion, and a progress of the intrusion; and
   (e) initiating a response to the event if the damage cost is greater than or equal to the response cost.

2. The method as recited in claim 1, wherein said generating a training set of data comprises training a sequence of training sets of data, wherein the training sets are ordered such that a first set of features of a first training set is a subset of a next subsequent set of features of a next subsequent training set, and wherein an associated cost of the first set of features is less than an associated cost of the next subsequent set of features.

3. The method as recited in claim 2, wherein said determining at least one model comprises determining an ordered sequence of rule sets for each respective training set in said ordered sequence of training sets, wherein the rule sets are ordered corresponding to the order of the respective training sets.

4. The method as recited in claim 3, further comprising, after said determining at least one model, for each rule in the ordered sequence of rule sets, determining a precision measurement indicative of the accuracy of the rule in predicting a class.

5. The method as recited in claim 4, wherein said determining a precision measurement comprises determining a ratio of positive counts of the rule to the total counts of the rule.

6. The method as recited in claim 4, further comprising, after said determining a precision measurement, for each said class, determining a threshold value indicative of a minimum precision for each class.

7. The method as recited in claim 6, wherein said computing said set of features comprises, beginning with a first rule set of said ordered sequence of rule sets, computing said set of features and predicting a class of said event with a rule of said rule set; and if the precision measurement corresponding to said rule is less than the threshold corresponding to the class, repeating said computing said features with the next rule set in said ordered sequence of rule sets.

8. The method as recited in claim 6, wherein the threshold value is determined as the precision value for the rule in the rule set corresponding to said feature set having a greatest cost.

9. The method as recited in claim 1, wherein a set of features comprises features computed using data available at the beginning of an event.

10. The method as recited in claim 1, wherein a set of features comprises features computed at any time during a duration of an event, and is maintained throughout the duration of the event.

11. The method as recited in claim 1, wherein a set of features comprises features computed using data from a plurality of events within a predetermined duration of time.

12. The method as recited in claim 1, wherein said determining at least one model comprises learning a rule set using a RIPPER algorithm.

13. The method as recited in claim 12, wherein said determining at least one model comprises learning an unordered rule set.

14. The method as recited in claim 1, further comprising logging an attack report if the damage cost is less than the response cost.

15. The method as recited in claim 1, wherein determining a response cost comprises estimating a cost associated with providing an automated response.

16. The method as recited in claim 1, wherein determining a response cost comprises estimating a cost associated with terminating a session.

17. The method as recited in claim 1, wherein determining a response cost comprises estimating a cost associated with implementing an operational rule.

18. The method as recited in claim 1, wherein determining a response cost comprises estimating a cost associated with rebooting the system.

19. The method as recited in claim 1, wherein determining a response cost comprises estimating a cost associated with recording a session.

20. The method as recited in claim 1, wherein determining a response cost comprises estimating a cost associated with providing a notification.

21. The method as recited in claim 1, wherein determining a response cost comprises estimating a cost associated with providing a manual response.

22. A method of modeling a cost-sensitive intrusion detection model, using at least one model, comprising:

(a) for each of a plurality of events, computing, using a computer programmed to do so, said set of features and predicting a class of said event using said at least one model;

(b) determining a response cost to be incurred by a computer system in responding to an event predicted as an intrusion in (a), wherein said response cost is estimated based upon the resources of the computer system to be expended in responding to the event; and determining a damage cost for an event predicted as an intrusion in (a), wherein said damage cost is determined based on at least one of the group consisting of a technique of the intrusion, a criticality of a component of the computer system subject to the intrusion, and a progress of the intrusion; and (c) initiating a response to the event if the damage cost is greater than or equal to the response cost.

23. The method as recited in claim 22, wherein the at least one model comprises a plurality of rule sets that are in an ordered sequence such that a first set of features evaluated by a first rule set is a subset of a next subsequent set of features evaluated by a next subsequent rule set, and wherein an associated cost of the first set of features is less than an associated cost the next subsequent set of features, and wherein said computing said set of features comprises, for each of a plurality of events, beginning with said first rule set, computing said set of features and predicting a class of said event with a rule of said rule set.

24. The method as recited in claim 23, wherein said computing said set of features and predicting a class of said event with a rule of said rule set comprises repeating said computing said set of features and predicting a class of said event with the next rule set in said ordered sequence of rule sets if a precision measurement indicative of the accuracy of said rule in predicting a class is less than a threshold value indicative of a minimum precision for said class.

25. The method as recited in claim 22, wherein said at least one model comprises a rule set learned using a RIPPER algorithm.

26. The method as recited in claim 25, further comprising learning an unordered rule set.

27. The method as recited in claim 22, further comprising logging an attack report if the damage cost is less than the response cost.

28. The method as recited in claim 22, wherein determining a response cost comprises estimating a cost associated with providing an automated response.

29. The method as recited in claim 22, wherein determining a response cost comprises estimating a cost associated with terminating a session.

30. The method as recited in claim 22, wherein determining a response cost comprises estimating a cost associated with implementing an operational rule.

31. The method as recited in claim 22, wherein determining a response cost comprises estimating a cost associated with rebooting the system.

32. The method as recited in claim 22, wherein determining a response cost comprises estimating a cost associated with recording a session.

33. The method as recited in claim 22, wherein determining a response cost comprises estimating a cost associated with providing a notification.

34. The method as recited in claim 22, wherein determining a response cost comprises estimating a cost associated with providing a manual response.

35. A method of modeling a cost-sensitive intrusion detection model, comprising:

(a) generating a training set of data suitable as input for machine learning, said training set of data comprising a set of features having associated costs;
(b) automatically determining, using a computer programmed to do so, at least one model based on said training set of data using machine learning;
(c) for each of a plurality of events, computing, using a computer programmed to do so, said set of features and predicting a class of said event using said at least one model;
(d) determining a response cost to be incurred by a computer system in responding to an event predicted as an intrusion in (c), wherein said response cost is estimated based upon the resources of the computer system to be expended in responding to the event,
(e) determining a damage cost for an event predicted as an intrusion in (c), wherein said damage cost is determined based on at least one of the group consisting of a technique of the intrusion, a criticality of a component of the computer system subject to the intrusion, and a progress of the intrusion;
(f) determining a metric for comparing the response cost and the damage costs; and
(g) initiating a response to the event if the damage cost is greater than or equal to the response cost.

* * * * *